(12) United States Patent
Hayashi

(10) Patent No.: US 7,349,445 B2
(45) Date of Patent: Mar. 25, 2008

(54) PHASE ADJUSTING APPARATUS, PHASE ADJUSTING METHOD FOR USE THEREIN, AND PROGRAM FOR PHASE ADJUSTING METHOD

(75) Inventor: Takeo Hayashi, Minato-ku (JP)

(73) Assignee: NEC Corporation, Tokyo (JP)

( * ) Notice: Subject to any disclaimer, the term of this patent is extended or adjusted under 35 U.S.C. 154(b) by 952 days.

(21) Appl. No.: 10/631,733

(22) Filed: Aug. 1, 2003

(65) Prior Publication Data

US 2004/0037182 A1 Feb. 26, 2004

(30) Foreign Application Priority Data

Aug. 21, 2002 (JP) ............... 2002-240040

(51) Int. Cl.
*H04J 3/06* (2006.01)
(52) U.S. Cl. .................... 370/516; 370/395.7
(58) Field of Classification Search ........... 370/431, 370/437, 480, 474, 503, 506, 509, 510, 512, 370/514, 516, 518, 535, 363, 368, 371, 374, 370/378, 38, 395.7, 395.71
See application file for complete search history.

(56) References Cited

U.S. PATENT DOCUMENTS 5,572,513 A * 11/1996 Yamamoto et al. ......... 370/217

7,095,758 B2 * 8/2006 Tomizawa et al. .......... 370/535

FOREIGN PATENT DOCUMENTS

| JP | 6-97975 A | 4/1994 |
|---|---|---|
| JP | 2002-232380 A | 8/2002 |
| JP | 2003-188844 A | 7/2003 |
| JP | 2003-333007 A | 11/2003 |

* cited by examiner

*Primary Examiner*—Brenda Pham
(74) *Attorney, Agent, or Firm*—Sughrue Mion, PLLC

(57) ABSTRACT

An MFI synchronization manager determines the continuity of MFI values to manage the synchronization of the MFI values. A phase adjuster detects a reference VC-3 channel of VC-3 channels which make up a virtual concatenation based on detected MFI values. A write controller writes frame data into a phase adjustment memory based on a write permission signal from the phase adjuster and data valid/invalid information. A write frame manager manages the frame data written in the phase adjustment memory with respect to each of the VC-3 channels and generates a read permission signal for the frame data whose all VC-3 channels of the concatenation have been written. A read controller reads the frame data from phase adjustment memory according to the read permission signal.

18 Claims, 14 Drawing Sheets

FIG. 3
PRIOR ART

MFI value
12 bits

| MFI2 | MFI1 |
|---|---|

| H4 bytes | | | | | | | | MFI1 | MFI2 |
|---|---|---|---|---|---|---|---|---|---|
| Bit1 | Bit2 | Bit3 | Bit4 | Bit5 | Bit6 | Bit7 | Bit8 | | |
| | | | | MFI1 (bit1-bit4) | | | | | |
| | | | | 1 | 1 | 1 | 0 | 14 | n-1 |
| | | | | 1 | 1 | 1 | 1 | 15 | |
| MFI 2 (bit1-bit4) | | | | 0 | 0 | 0 | 0 | 0 | n |
| MFI 2 (bit5-bit8) | | | | 0 | 0 | 0 | 1 | 1 | |
| | | | | 0 | 0 | 1 | 0 | 2 | |
| | | | | 0 | 0 | 1 | 1 | 3 | |
| | | | | 0 | 1 | 0 | 0 | 4 | |
| | | | | 0 | 1 | 0 | 1 | 5 | |
| | | | | 0 | 1 | 1 | 0 | 6 | |
| | | | | 0 | 1 | 1 | 1 | 7 | |
| | | | | 1 | 0 | 0 | 0 | 8 | |
| | | | | 1 | 0 | 0 | 1 | 9 | |
| | | | | 1 | 0 | 1 | 0 | 10 | |
| | | | | 1 | 0 | 1 | 1 | 11 | |
| | | | | 1 | 1 | 0 | 0 | 12 | |
| | | | | 1 | 1 | 0 | 1 | 13 | |
| | | | | 1 | 1 | 1 | 0 | 14 | |
| | | | | 1 | 1 | 1 | 1 | 15 | |
| MFI 2 (bit1-bit4) | | | | 0 | 0 | 0 | 0 | 0 | n+1 |
| MFI 2 (bit5-bit8) | | | | 0 | 0 | 0 | 1 | 1 | |

FIG. 8

| | VC-3 #1 | VC-3 #2 | VC-3 #3 | VC-3 #4 | VC-3 #5 | VC-3 #6 | VC-3 #7 | VC-3 #8 | ... | VC-3 #n |
|---|---|---|---|---|---|---|---|---|---|---|
| Virtual Concatenation #1 | 1 | 0 | 0 | 0 | 0 | 0 | 0 | 0 | .... | 0 |
| Virtual Concatenation #2 | 0 | 1 | 0 | 0 | 0 | 0 | 0 | 1 | .... | 0 |
| Virtual Concatenation #3 | 0 | 0 | 1 | 1 | 0 | 0 | 0 | 0 | .... | 0 |
| Virtual Concatenation #4 | 0 | 0 | 0 | 0 | 1 | 1 | 0 | 0 | .... | 0 |
| ... | | | | | | | | | | |
| Virtual Concatenation #m | 0 | 0 | 0 | 0 | 0 | 0 | 1 | 0 | .... | 1 |

PHASE ADJUSTING APPARATUS, PHASE ADJUSTING METHOD FOR USE THEREIN, AND PROGRAM FOR PHASE ADJUSTING METHOD

BACKGROUND OF THE INVENTION

1. Field of the Invention

The present invention relates to a phase adjusting apparatus, a phase adjusting method for use therein, and a program for such a phase adjusting method, and more particularly to a phase adjusting method for absorbing a differential delay without depending on the pointer stuff in a virtual concatenation of a plurality of VC (Virtual Container)-3 channels of a signal which is made up of multiplexed VC-3 channels.

2. Description of the Related Art

The frame format of an STM (Synchronous Transfer Mode)-16 frame which is made up of multiplexed 48 VC-3 channels is illustrated in FIG. 1 of the accompanying drawings. As shown in FIG. 1, the STM-16 frame comprises section overhead (SOH) 600 for transferring data of a monitoring control system, payload 604, and area 601 for storing pointer information representative of leading ends of multiplexed VC-3 channels.

Payload 604 comprises multiplexed 48 VC-3 channels 602-1 through 602-48. Each of VC-3 channels 602-1 through 602-48 has path overhead (POH) 605 for transferring data of the monitoring control system.

For handling a plurality of VC-3 channels 602-1 through 602-48 as a single data transfer area, virtual concatenation has been standardized by G.707/G783 of ITU-T (International Telecommunication Union-Telecommunication Standardization Sector).

For example, it is assumed that three VC-3 channels are handled as a virtual concatenation and will be transferred from node 71 to node 76 as shown in FIG. 2 of the accompanying drawings. Since each of the VC-3 channels may possibly be transferred through one of three paths 701, 702, 703, the VC-3 channels that are received by node 76 are brought out of phase with each other due to device delays caused by intermediate nodes 72-75 and delays caused by different path lengths. Therefore, some scheme is necessary to absorb the phase differences at the node which terminates the virtual concatenation.

According to the virtual concatenation, H4 byte 603 of path overhead 605 of each VC-3 channel stores MFI (Multi-Frame Indicator) which is a number representative of the order of the VC-3 channels as a scheme for detecting and processing the phase differences.

FIG. 3 of the accompanying drawings shows MFI values stored at H4 bytes. The concept of pointer stuff of SDH/SONET (Synchronous Digital Hierarchy/Synchronous Optical NETwork) will be described below with reference to FIGS. 1 through 3.

If nodes 71, 76 shown in FIG. 2 operate according to independent clocks, i.e., nodes 71, 76 have respective clock sources, nodes 71, 76 have slightly different clock speeds due to different accuracies of their clock sources.

The STM-16 frame has stuff areas 606, 607 for transferring the data normally regardless of the different clock speeds of nodes 71, 76. If the clock speed of the transmission node is higher than the clock speed of the reception node, then stuff area 606 in SOH 600 is used as a data area thereby to increase the number of bytes that can be transferred per frame, so that the data can be received at the clock speed of the reception node. If the clock speed of the transmission node is lower than the clock speed of the reception node, then stuff area 607 in payload 604 is not used as a data area thereby to reduce the number of bytes that can be transferred per frame.

When the transmission and reception nodes operate according to independent clocks, if a differential delay of a virtual concatenation is absorbed by a memory, then the buffer suffers an underflow or an overflow at the time the stored data is read at a constant rate. The buffer may be prevented from suffering an overflow when the stored data is read at a rate higher than when the data is written. However, when the buffer suffers an underflow, it is necessary to recognize the timing at which the data is to be read again.

For example, if a virtual concatenation comprises VC-3#1 channel, VC-3#2 channel, and VC-3#3 channel, then since the data is mapped one byte by one byte in the order of VC-3#1 channel, VC-3#2 channel, and VC-3#3 channel at a data mapping node, the data needs to be read one byte by one byte from VC-3#1 channel, VC-3#2 channel, and VC-3#3 channel at a data restoring node.

Consequently, when an underflow occurs, it is necessary to start reading the data at such a timing that at least one byte of data needs to be stored in the memory for storing the VC-3 channels of the virtual concatenation. Stated otherwise, the reading node is required to recognize, at all times, whether data is stored in the memory or not. One process of determining whether data is stored in the memory or not is to manage and compare write and read addresses of storage areas which are reserved in a phase adjustment memory for storing the VC-3 channels.

However, the above conventional phase adjusting process is problematic in that the circuit required for performing the process is complex and large in scale because it is necessary to determine, at all times, whether data of each of the VC-3 channels is stored in the phase adjustment memory or not based on the write and read addresses, and when data of all the VC-3 channels of the virtual concatenation are stored, the stored data need to be read.

The phase adjustment memory usually comprises an external memory, and storage areas thereof for storing respective VC-3 channels are managed with write and read addresses. Therefore, as the number of multiplexed VC-3/VC-4 channels and storage areas (addresses) are larger, the required circuit is more complex and larger in scale.

SUMMARY OF THE INVENTION

It is therefore an object of the present invention to provide a phase adjusting apparatus, a phase adjusting method for use therein, and a program for such a phase adjusting method, which are capable of adjusting phases without involving an increase in circuit scale and without depending on the generation of pointer stuff in SDH.

According to the present invention, there is provided a phase adjusting apparatus for managing a chronological sequence of VC channels in a virtual concatenation which is made up of the VC channels in a signal of multiplexed VC channels, and adjusting phases if the continuity of MFI values to which successive values are assigned for each frame is lost, the phase adjusting apparatus comprising a phase adjustment memory for writing therein the VC channels for adjusting phases, managing means for managing the MFI values of frames written into the phase adjustment memory, judging means for determining whether all the VC channels making up the virtual concatenation have been written into the phase adjustment memory based on the MFI values managed by the managing means, and reading means for reading each frame from the phase adjustment memory, which frame is determined as having been written in the phase adjustment memory by the judging means.

According to the present invention, there is also provided a phase adjusting apparatus for managing a chronological sequence of VC channels in a virtual concatenation which is made up of the VC channels in a signal of multiplexed VC channels, and adjusting phases if the continuity of MFI values to which successive values are assigned for each frame is lost, the phase adjusting apparatus comprising a phase adjustment memory for writing therein the VC channels for adjusting phases, holding means associated respectively with the VC channels, for holding only valid data of data read from the phase adjustment memory, judging means for determining whether all the VC channels making up the virtual concatenation have been written into the holding means, and reading means for reading a frame from the holding means, which frame is determined as having been written in the holding means by the judging means.

According to the present invention, there is further provided a method of managing a chronological sequence of VC channels in a virtual concatenation which is made up of the VC channels in a signal of multiplexed VC channels, and adjusting phases if the continuity of MFI values to which successive values are assigned for each frame is lost, the method comprising the steps of managing the MFI values of frames written into a phase adjustment memory in which the VC channels are written for adjusting phases, determining whether all the VC channels making up the virtual concatenation have been written into the phase adjustment memory based on the managed MFI values, and reading each frame from the phase adjustment memory, which frame is determined as having been written in the phase adjustment memory.

According to the present invention, there is provided a method of managing a chronological sequence of VC channels in a virtual concatenation which is made up of the VC channels in a signal of multiplexed VC channels, and adjusting phases if the continuity of MFI values to which successive values are assigned for each frame is lost, the method comprising the steps of holding, in holding means associated respectively with the VC channels, only valid data of data read from a phase adjustment memory in which the VC channels are written for adjusting phases, determining whether all the VC channels making up the virtual concatenation have been written into the holding means, and reading a frame from the holding means, which frame is determined as having been written in the holding means.

According to the present invention, there is provided a computer program for performing a phase adjusting method of managing a chronological sequence of VC channels in a virtual concatenation which is made up of the VC channels in a signal of multiplexed VC channels, and adjusting phases if the continuity of MFI values to which successive values are assigned for each frame is lost, the computer program enabling a computer to carry out the steps of managing the MFI values of frames written into a phase adjustment memory in which the VC channels are written for adjusting phases, determining whether all the VC channels making up the virtual concatenation have been written into the phase adjustment memory based on the managed MFI values, and reading each frame from the phase adjustment memory, which frame is determined as having been written in the phase adjustment memory.

According to the present invention, there is also provided a computer program for performing a phase adjusting method of managing a chronological sequence of VC channels in a virtual concatenation which is made up of the VC channels in a signal of multiplexed VC channels, and adjusting phases if the continuity of MFI values to which successive values are assigned for each frame is lost, the computer program enabling a computer to carry out the steps of holding, in holding means associated respectively with the VC channels, only valid data of data read from a phase adjustment memory in which the VC channels are written for adjusting phases, determining whether all the VC channels making up the virtual concatenation have been written into the holding means, and reading a frame from the holding means, which frame is determined as having been written in the holding means.

In transmitting data with a virtual concatenation made up of a plurality of VC-3 or VC-4 channels that provide a single bandwidth, the phase adjusting apparatus according to the present invention can absorb a differential delay caused due to path length differences without depending on the generation of pointer stuff.

More specifically, with the phase adjusting apparatus according to the present invention, an SDH terminator detects the leading end of a frame from received data and detects pointers indicative of the leading ends of multiplexed VC-3 frames from the frame leading end information to detect the leading ends of the multiplexed VC-3.

An MFI detector detects MFI values from H4 bytes at fixed positions from the detected leading ends of the VC-3 channels. An MFI synchronization manager manages the synchronized state of the MFI values that are detected by the MFI detector. A phase adjuster detects a VC-3 channel which has arrived at the earliest time when the MFI synchronization manager has established a synchronization for all the VC-3 channels that make up a virtual concatenation.

A write controller writes other data than SOH/POH of VC-3 channels which are permitted to be written, into a phase adjustment memory based on the data transmitted from the SDH terminator, a signal indicative of the other data than SOH/POH of VC-3 channels, and a write permission signal from the phase adjuster. A write frame manager manages the MFI values of a frame written into the phase adjustment memory with respect to each of the VC-3 channels.

A read controller reads frames whose all VC-3 channels of the virtual concatenation have been written based on the MFI values managed by the write frame manager and the information of the VC-3 channels of the virtual concatenation. If not all VC-3 channels of the virtual concatenation have been written, the read controller does not read frames until all frames having the same MFI values have been written. When the read controller have read the frames, the read controller refers to the MFI values managed by the write frame manager again, and determines whether a next frame is to be read or not.

The write frame manager manages the MFI values written in the phase adjustment memory, and reads each of frames whose all VC-3 channels of the virtual concatenation have been written. Therefore, the phase adjusting apparatus is capable of absorbing a differential delay without depending on the generation of pointer stuff.

The above and other objects, features, and advantages of the present invention will become apparent from the following description with reference to the accompanying drawings which illustrate examples of the present invention.

BRIEF DESCRIPTION OF THE DRAWINGS

FIG. 3 is a diagram showing MFI values stored at H4 bytes;

FIG. 8 is a diagram showing an example of VC configuration settings of the phase adjusting apparatus shown in FIG. 4;

DETAILED DESCRIPTION OF THE PREFERRED EMBODIMENTS

Figure 1:
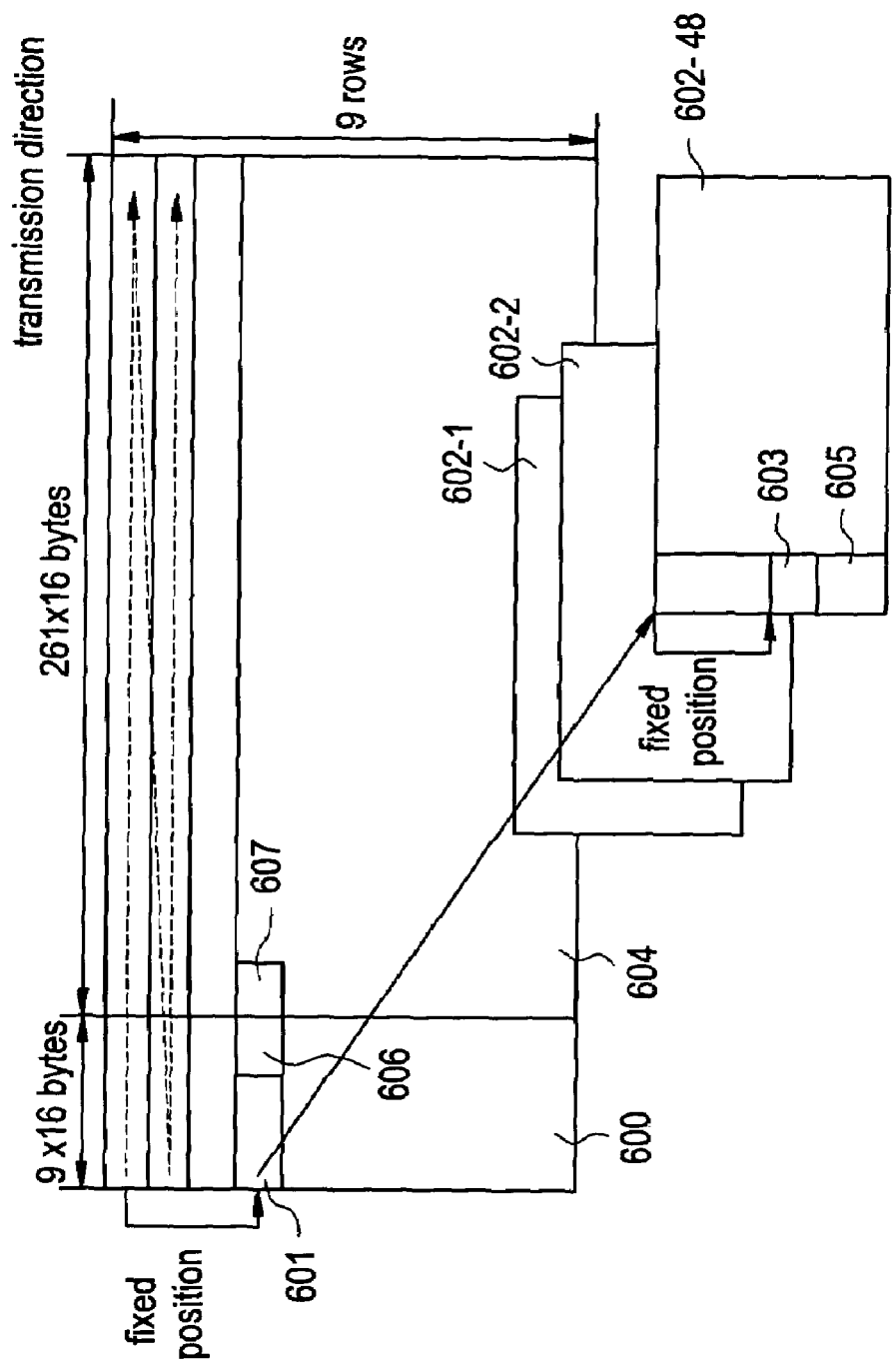
FIG. 1 is a diagram showing the frame format of an STM-16 frame which is made up of multiplexed 48 VC-3 channels.
Figure 2:
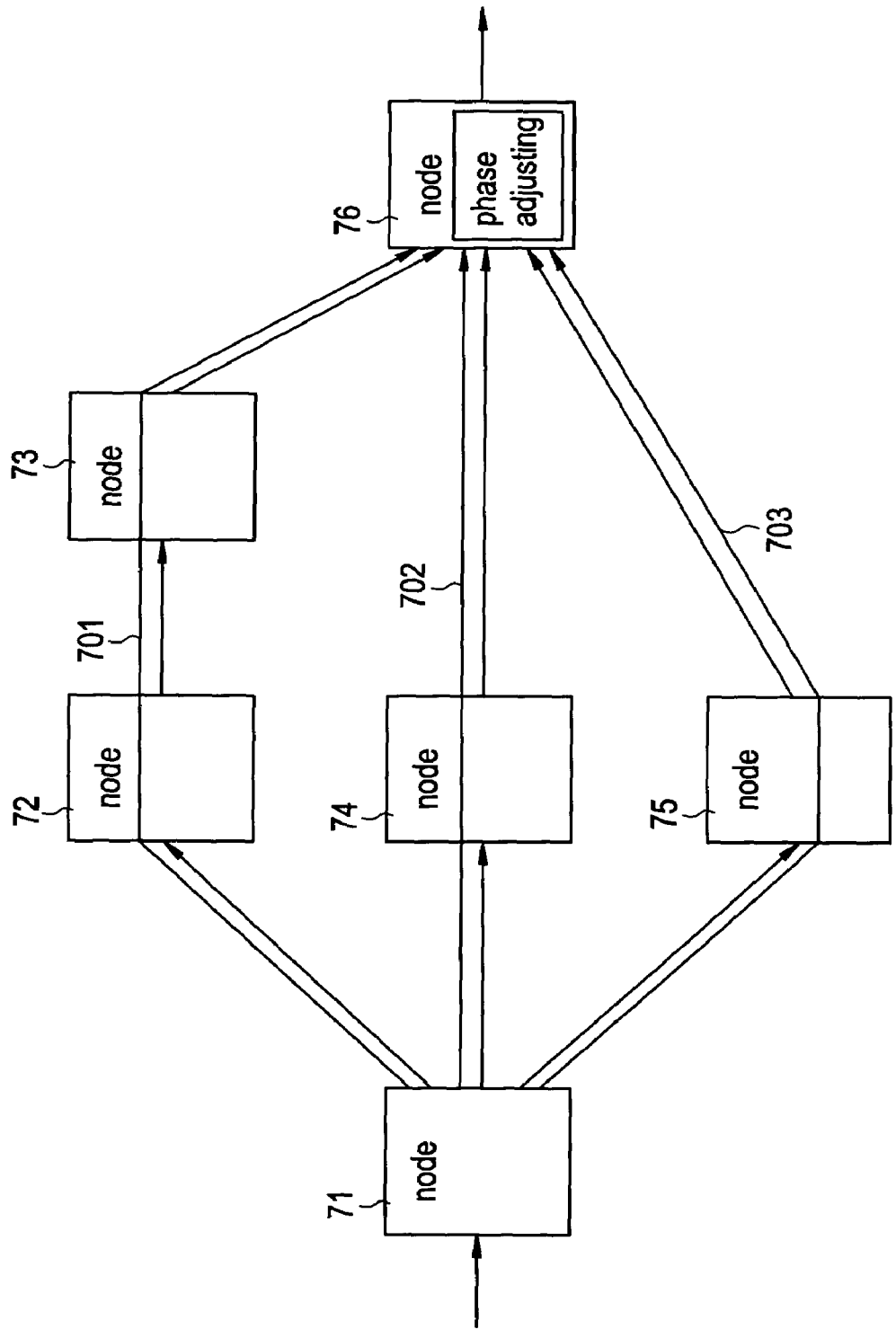
FIG. 2 is a diagram showing a plurality of paths for transferring a concatenation.
Figure 4:
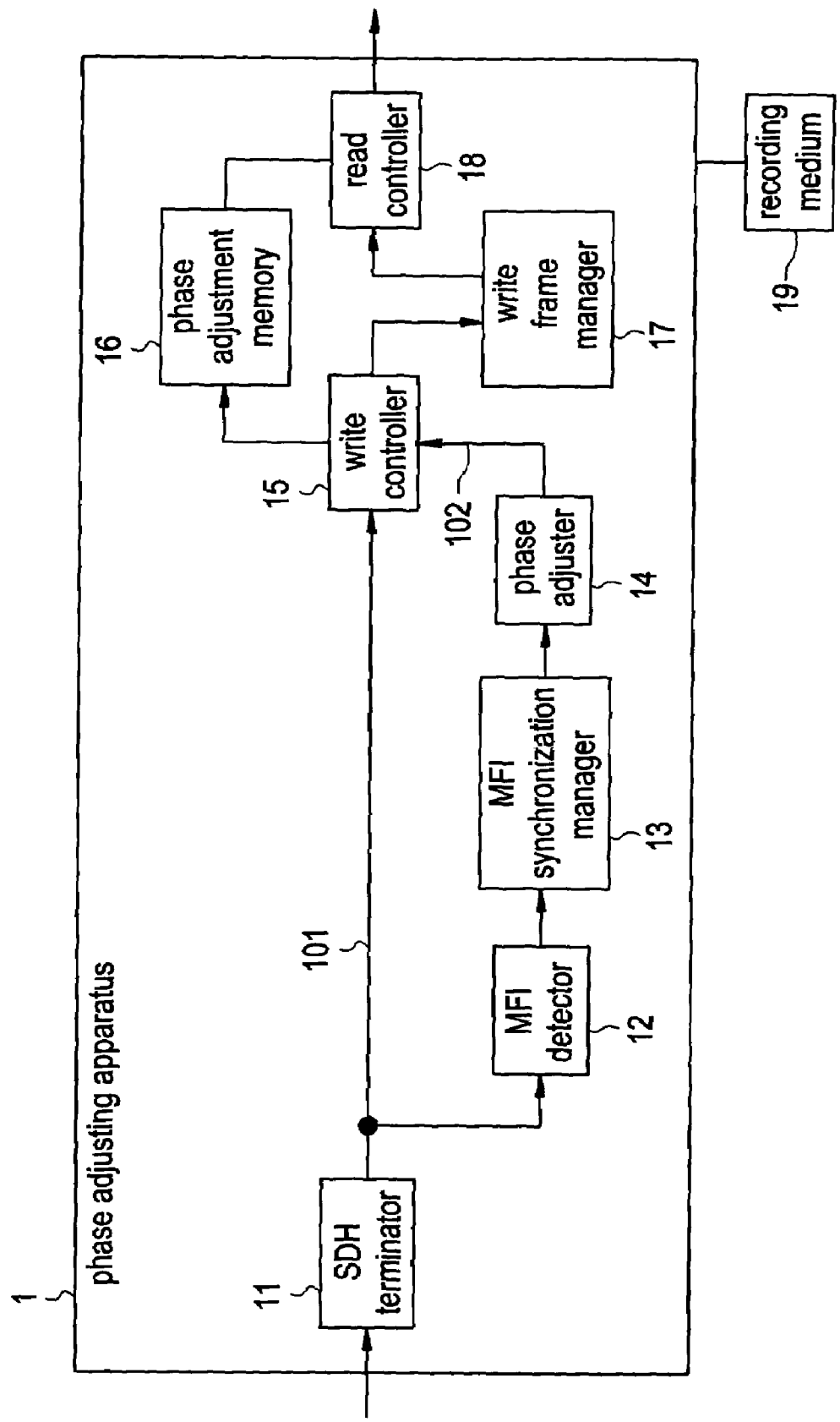
FIG. 4 is a block diagram of a phase adjusting apparatus according to an embodiment of the present invention.

FIG. 4 shows in block form phase adjusting apparatus 1 according to an embodiment of the present invention. As shown in FIG. 4, phase adjusting apparatus 1 comprises SDH (Synchronous Digital Hierarchy) terminator 11, MFI ((Multi-Frame Indicator) detector 12, MFI synchronization manager 13, phase adjuster 14, write controller 15, phase adjustment memory 16, write frame manager 17, read controller 18, and recording medium 19.

SDH terminator 11 detects the leading end of a frame from received data and detects the leading ends of multiplexed VC-3 frames from pointer information in order to detect MFI information for managing a chronological sequence of VC (Virtual Container)-3 channels that make up a virtual concatenation.

MFI detector 12 detects MFI values from H4 bytes at fixed positions from the leading end information of the multiplexed VC-3 channels. MFI synchronization manager 13 determines the continuity of the detected MFI values to manage the synchronization of the MFI values. Phase adjuster 14 detects a reference VC-3 channel of the VC-3 channels of the virtual concatenation based on the detected MFI values. Write controller 15 writes frame data into phase adjustment memory 16 based on write permission signal 102 from phase adjuster 14 and data valid/invalid information 101 from SDH terminator 11.

Write frame manager 17 manages the frame data written by write controller 15 with respect to each of the VC-3 channels and generates a read permission signal for the frame data whose all VC-3 channels of the concatenation have been written. Read controller 18 reads the frame data from phase adjustment memory 16 according to the read permission signal. Recording medium 19 stores a program that can be run by a computer (not shown) of phase adjusting apparatus 1. The functions of the above components of phase adjusting apparatus 1 are performed when the computer executes the program stored in recording medium 19.

Figure 5:
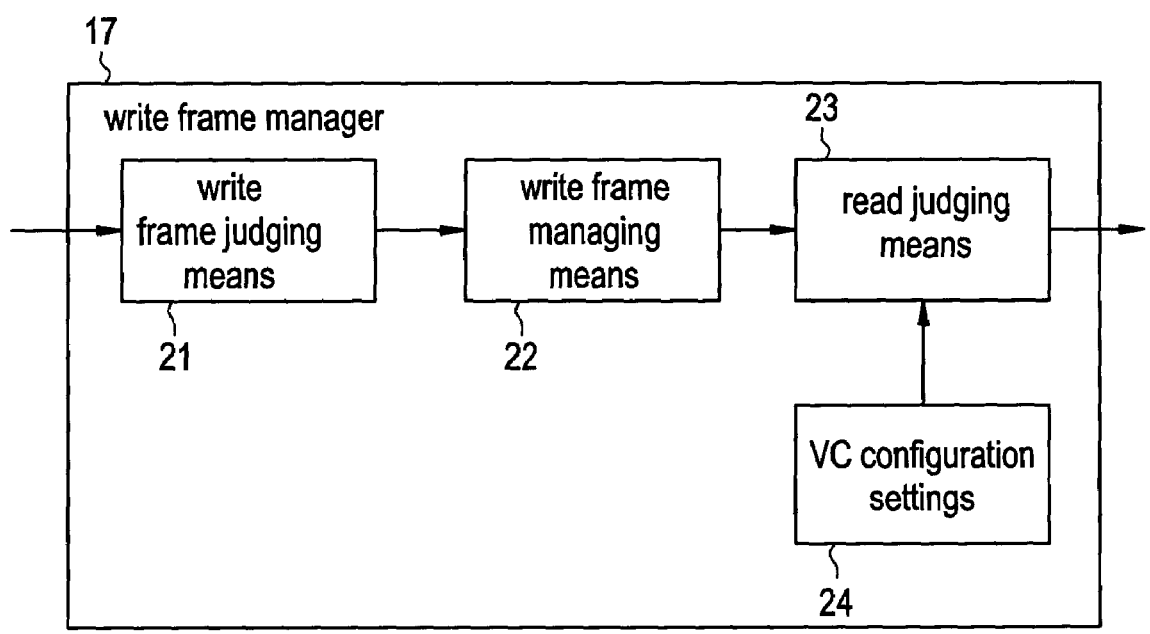
FIG. 5 is a block diagram of a write frame manager of the phase adjusting apparatus shown in FIG. 4.

FIG. 5 shows in block form write frame manager 17 shown in FIG. 4. As shown in FIG. 5, write frame manager 17 comprises write frame judging means 21, write frame managing means 22, read judging means 23, and VC configuration settings 24.

Write frame judging means 21 determines whether a frame has been written by write controller 15 based on the information of the MFI values of the frame written in phase adjustment memory 16 or not. Write frame managing means 22 manages the MFI values of a frame which is judged as being written by write frame judging means 21. Read judging means 23 determines a frame that can be read on the basis of VC configuration settings 24 of a virtual concatenation.

Figure 6:
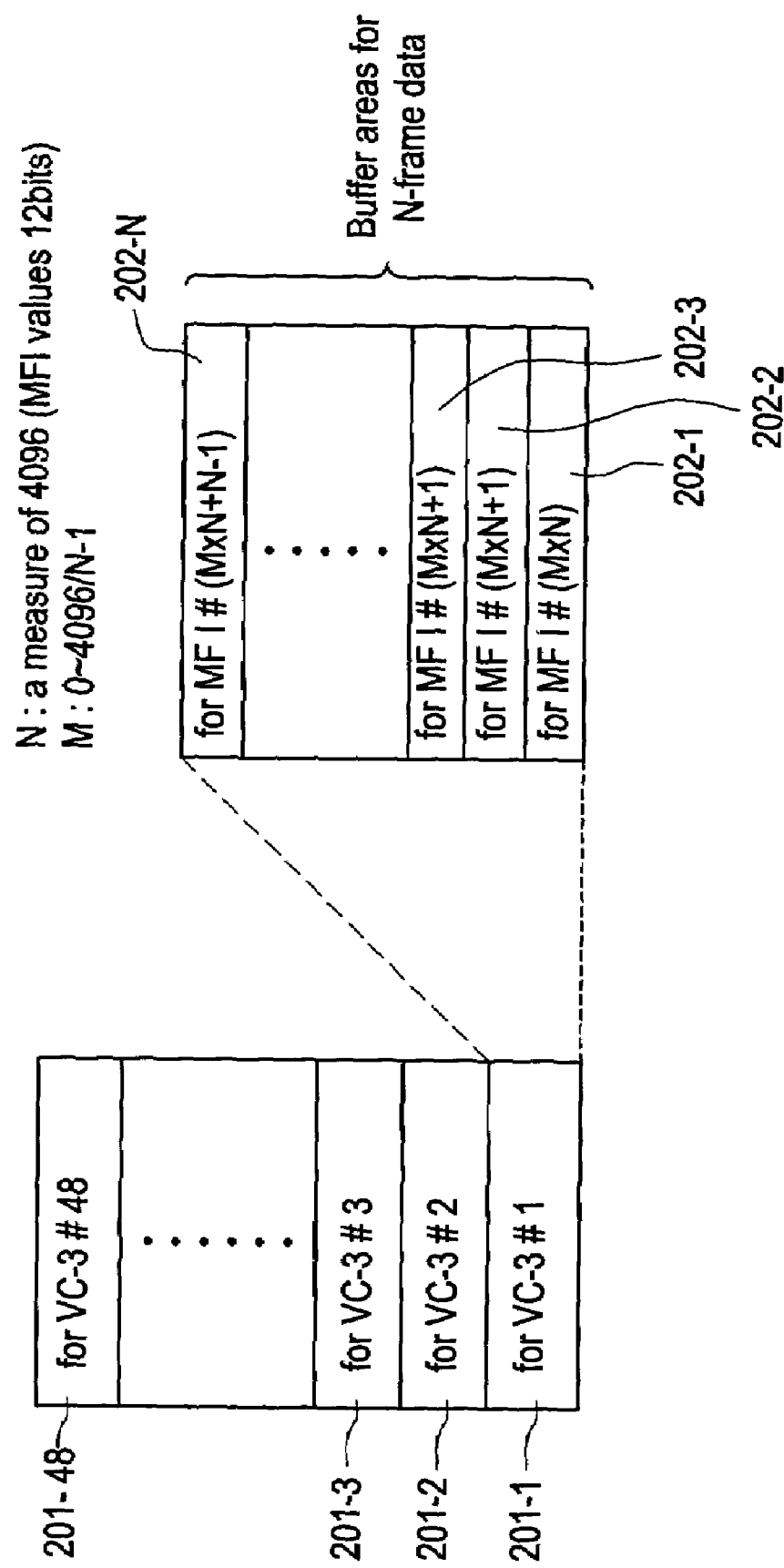
FIG. 6 is a diagram showing storage areas of a phase adjustment memory of the phase adjusting apparatus shown in FIG. 4.

FIG. 6 shows storage areas of phase adjustment memory 16 shown in FIG. 4. The storage areas of phase adjustment memory 16 shown in FIG. 6 serve to store data of an STM (Synchronous Transfer Mode)-16 frame which is made up of multiplexed 48 VC-3 channels. Phase adjustment memory 16 is divided into storage areas 201-1 through 201-48 for storing respective VC-3 channels #1 through #48. Each of divided storage areas 201-1 through 201-48 is divided into areas 202-1 through 202-N for storing N-frame data MFI# (M×N) through MFI#(M×N+N−1).

Figure 7:
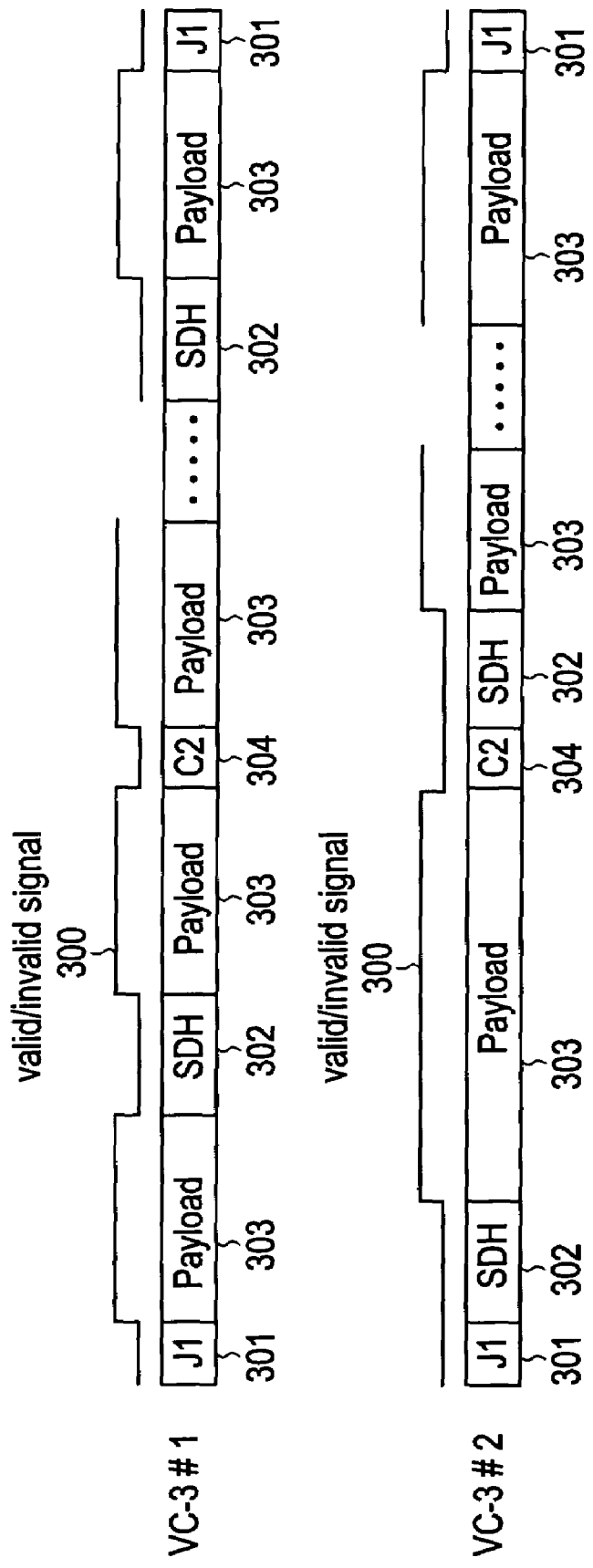
FIG. 7 is a diagram showing data transferred from an SDH terminator of the phase adjusting apparatus shown in FIG. 4.

FIG. 7 shows data transferred from SDH terminator 11 shown in FIG. 4. As shown in FIG. 7, since VC-3 channels #1, #2 have different pointer values in SDH frames, leading bytes (J1 bytes) 301 of the VC-3 channels begin from different locations in the SDH frames.

With respect to VC-3 channel #1, after leading byte 301, payload 303 is transferred for a while, and then SOH (Section OverHead) 302 is transferred. With respect to VC-3 channel #2, immediately after leading byte 301, SOH 302 is transferred, and then payload 303 is transferred. Therefore, valid data areas are transferred at different timings for different VC-3 channels.

FIG. 8 shows an example of VC configuration settings 24 shown in FIG. 5. As shown in FIG. 8, VC configuration settings 24 have "1" set to those VC-3 channels which correspond to virtual concatenations made up of those VC-3 channels so as to be able to recognize VC-3 channels 401-1 through 401-$n$ which make up virtual concatenations 402-1 through 402-$m$.

Figure 9:
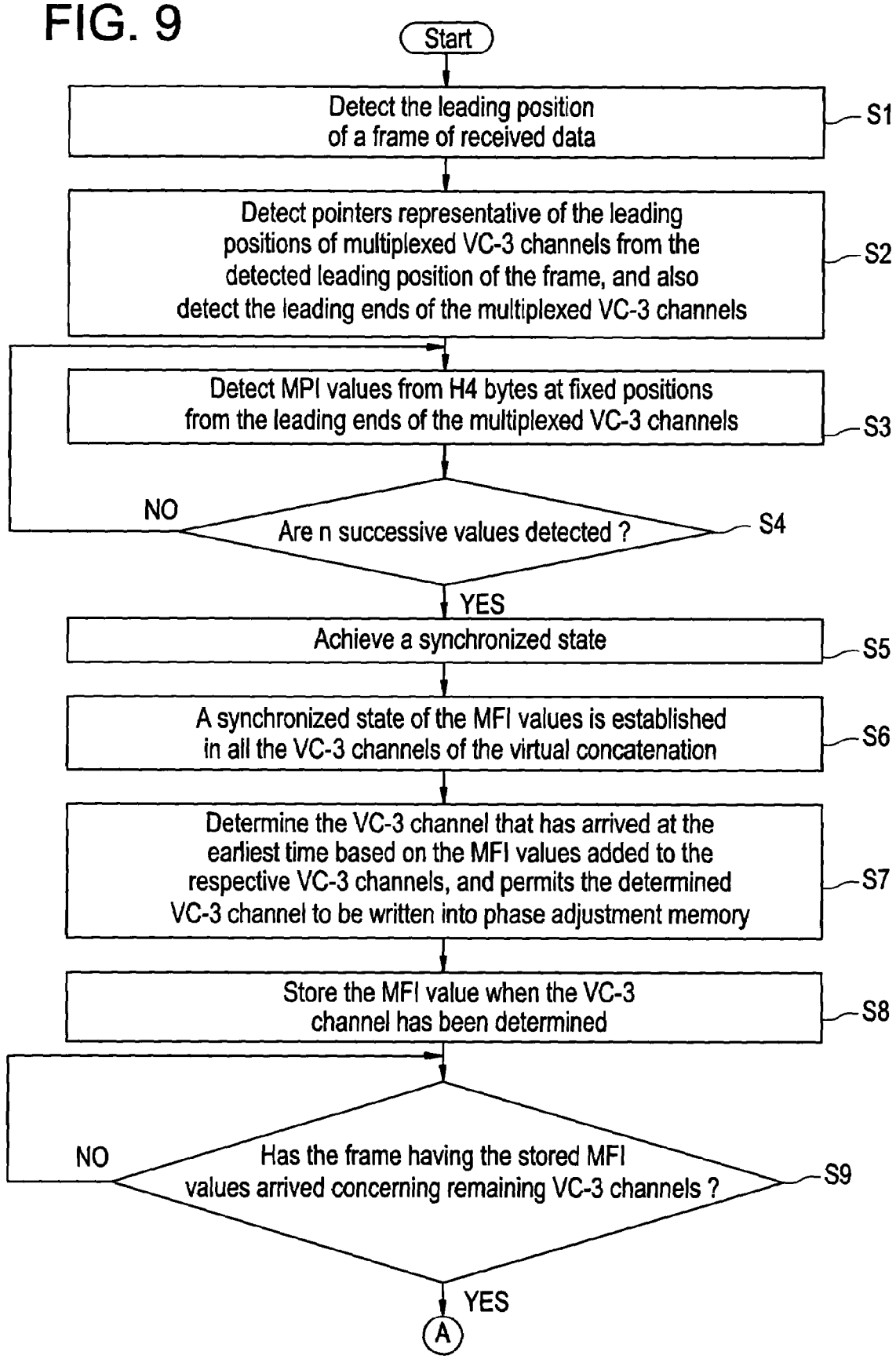
FIG. 9 is a flowchart of a portion of a processing sequence of the phase adjusting apparatus according to the embodiment of the present invention.
Figure 10:
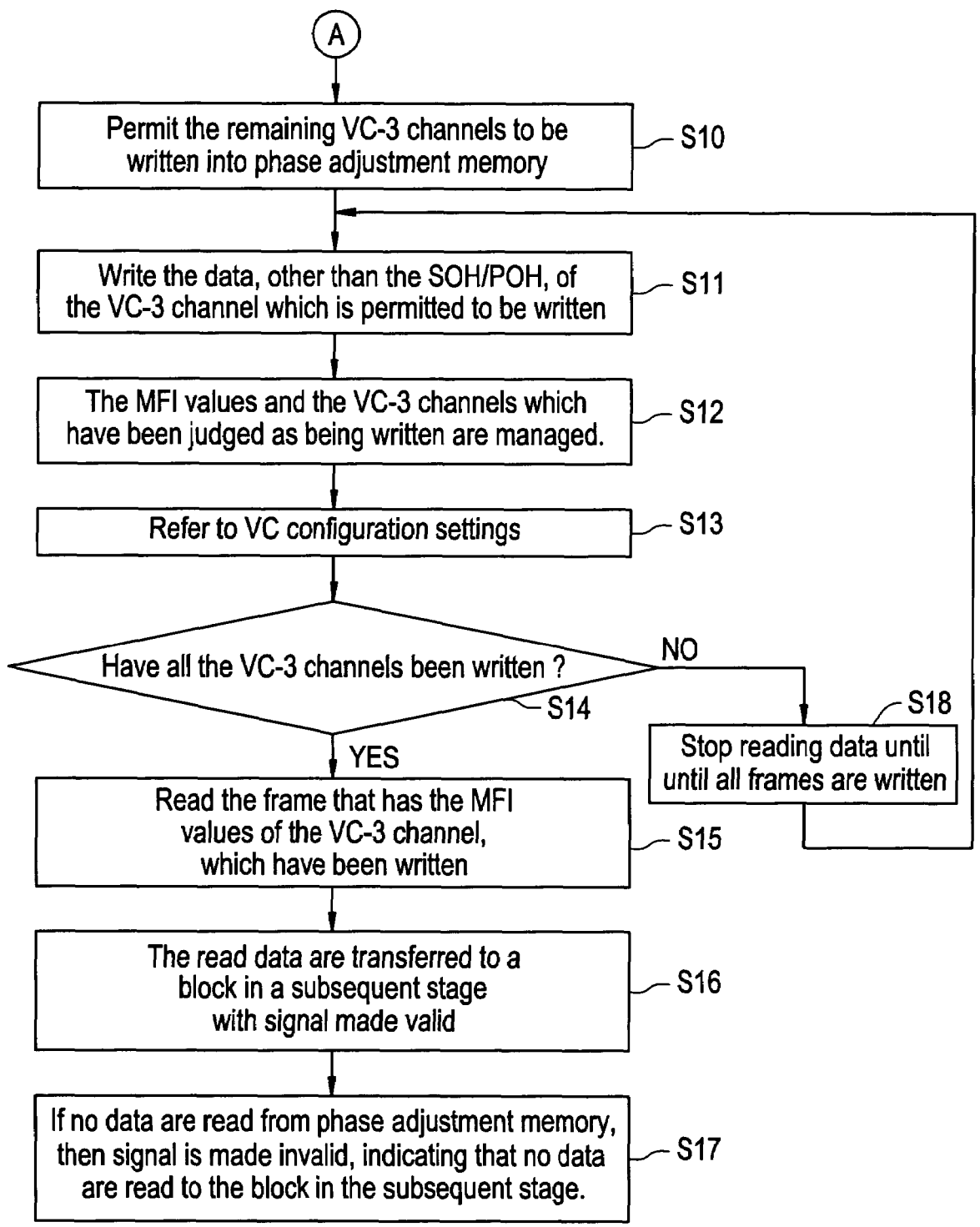
FIG. 10 is a flowchart of a remaining portion of the processing sequence of the phase adjusting apparatus according to the embodiment of the present invention.

FIGS. 9 and 10 show a processing sequence of phase adjusting apparatus 1 according to the above embodiment of the present invention. Processing operation of phase adjusting apparatus 1 will be described below with reference to FIGS. 4 through 10. The processing sequence shown in FIGS. 9 and 10 is carried out when the program stored in recording medium 19 is run by the computer of phase adjusting apparatus 1.

SDH terminator 11 detects the leading position of a frame of received data in step S1 (see FIG. 9), and then detects pointers representative of the leading positions of multiplexed VC-3 channels from the detected leading position of the frame, and also detects the leading ends of the multiplexed VC-3 channels in step S2. MFI detector 12 detects MFI values from H4 bytes at fixed positions from the leading ends of the multiplexed VC-3 channels in step S3. Since successive values are assigned to the MFI values for each frame, MFI synchronization manager 13 achieves a synchronized state of the MFI values if n successive values are detected (the number of protected stages is n) in steps S4, S5.

When a synchronized state of the MFI values is established in all the VC-3 channels of the virtual concatenation in step S6, phase adjuster 14 determines the VC-3 channel that has arrived at the earliest time based on the MFI values added to the respective VC-3 channels, and permits the determined VC-3 channel to be written into phase adjustment memory 16 in step S7. When phase adjuster 14 has determined the VC-3 channel that has arrived at the earliest time, phase adjuster 14 stores the MFI value thereof in step S8. Then, phase adjuster 14 permits the remaining VC-3 channels to be written into phase adjustment memory 16 when the frame having the stored MFI values has arrived in step S9 and step S10 shown in FIG. 10.

Write controller 15 writes the data, other than the SOH/POH (Section OverHead/Path OverHead), of the VC-3 channel which is permitted to be written based on write permission signal 102 from phase adjuster 14 in step S11. Signal 101 indicative of the other data than the SOH/POH is transmitted from SDH terminator 11, and can be generated from the leading information of the frame and the leading information of the VC-3 channel based on the pointer information. Write controller 15 indicates the MFI values of the frame which has been written to the write frame manager 17.

In write frame manager 17, write frame judging means 21 determines the MFI values of the frame which has been written that have been indicated by write controller 15, and the MFI values which have been judged as being written by write frame judging means 21 are managed by write frame managing means 22 in step S12.

Read judging means 23 refers to VC configuration settings 24 representing the information of the VC-3 channels that make up the virtual concatenation in step S13, and sends a read permission signal to read controller 18 for starting to read the frame that has the MFI values of all the VC-3 channels, which have been written, of the virtual concatenation in steps S14, S15.

Then, a process of writing data in phase adjustment memory 16 will be described below. In the present embodiment, it is assumed that an STM-16 frame is made up of 48 multiplexed VC-3 channels having SDH input frames.

As shown in FIG. 6, phase adjustment memory 16 is divided into storage areas 201-1 through 201-48 for storing respective VC-3 channels, and each of storage areas 201-1 through 201-48 is divided into areas 202-1 through 202-N for storing N-frame data.

For example, if N=32, then divided area 202-1 serves to store data of MFI values "0", "32", ..., "4064", divided area 202-2 serves to store data of MFI values "1", "33", ..., "4065", and divided area 202-32 serves to store data of MFI values "31", "63", ..., "4095".

The data transferred from SDH terminator 11 if the virtual concatenation is made of VC-3 channels #1, #2 are illustrated in FIG. 7. Since VC-3 channels #1, #2 have different pointer values in SDH frames, leading bytes (J1 bytes) 301 of the VC-3 channels begin from different locations in the SDH frames. Specifically, with respect to VC-3 channel #1, after leading byte 301, payload 303 is transferred for a while, and then SOH 302 is transferred. With respect to VC-3 channel #2, immediately after leading byte 301, SOH 302 is transferred, and then payload 303 is transferred. Therefore, valid data areas are transferred at different timings for different VC-3 channels.

Write controller 15 writes payload 303 (other than the SOH/POH) only into phase adjustment memory 16 based on a signal (valid/invalid signal 300) indicative of payload 303 that is transferred together with the data transferred from SDH terminator 11, in step S11. The signal indicative of other than the SOH/POH is "0" in areas 301, 302, 304 shown in FIG. 7 and "1" in other areas 303 shown in FIG. 7.

VC configuration settings 24 which are required to determine whether the data can be read or not will be described below. An example of VC configuration settings 24 is shown in FIG. 8. In an SDH frame made up of VC-3 channels #1 through #m, VC configuration settings 24 represent the existence of virtual concatenations #1 through #m.

With respect to virtual concatenations 402-1 through 402-*m*, VC configuration settings 24 have "1" set to some of VC-3 channels VC-3 channels 401-1 through 401-*n* to identify those VC-3 channels that make up virtual concatenations. It can be seen from the example shown in FIG. 8 that virtual concatenation #1 is made up of VC-3 channels #1, #3, virtual concatenation #2 is made up of VC-3 channels #2, #8, and virtual concatenation #3 is made up of VC-3 channels #7, #n.

Read controller 18 reads frames which have been judged as being readable by reading judging means 23. Frames that can be read are composed of all VC-3 channels that make up a virtual concatenation having the same MFI values and which has been written in phase adjustment memory 16. For example, if VC-3 channels #1, #2, #3 make up a virtual concatenation, then when the respective frames of VC-3 channels #1, #2, #3 having the MFI value "0" have been written in phase adjustment memory 16, the frames of VC-3 channels #1, #2, #3 are read from the storage area thereof for the MFI value "0".

After the frames having the MFI value "0" have been read, read controller 18 confirms whether all frames having the MFI value "1" have been written or not. If written, then read controller 18 starts reading the frames having the MFI value "1" from phase adjustment memory 16. If not written, then read controller 18 stops reading data until all frames having the MFI value "1" are written in step S18.

The read data are transferred to a block in a subsequent stage with valid/invalid signal 300 made valid in step S16. If no data are read from phase adjustment memory 16, then valid/invalid signal 300 is made invalid, indicating that no data are read from phase adjustment memory 16 to the block in the subsequent stage in step S17.

In the present embodiment, the process of reading VC-3 channels multiplexed in a STM-16 frame has been described above. However, the STM-16 frame may be replaced with an STM-64 frame, an STM-4 frame, etc., and the VC-3 channels may be replaced with VC-4 channels.

According to the present embodiment, the MFI values of a frame written in phase adjustment memory 16 are managed, an when the data of a frame having the same MFI values with respect to all VC-3 channels that make up a concatenation are written into phase adjustment memory 16, the frame data will be read from phase adjustment memory 16. Therefore, phase adjustment can be performed without depending on the generation of pointer stuff in SDH.

Heretofore, each time data are to be read from phase adjustment memory 16, it is necessary to confirm whether data have been written in phase adjustment memory 16 for each byte with respect to all VC-3 channels that make up a concatenation or not. According to the present embodiment, however, since it is only necessary to determine whether data have been written in phase adjustment memory 16 for frame byte, the required circuit may be smaller in scale.

Figure 11:
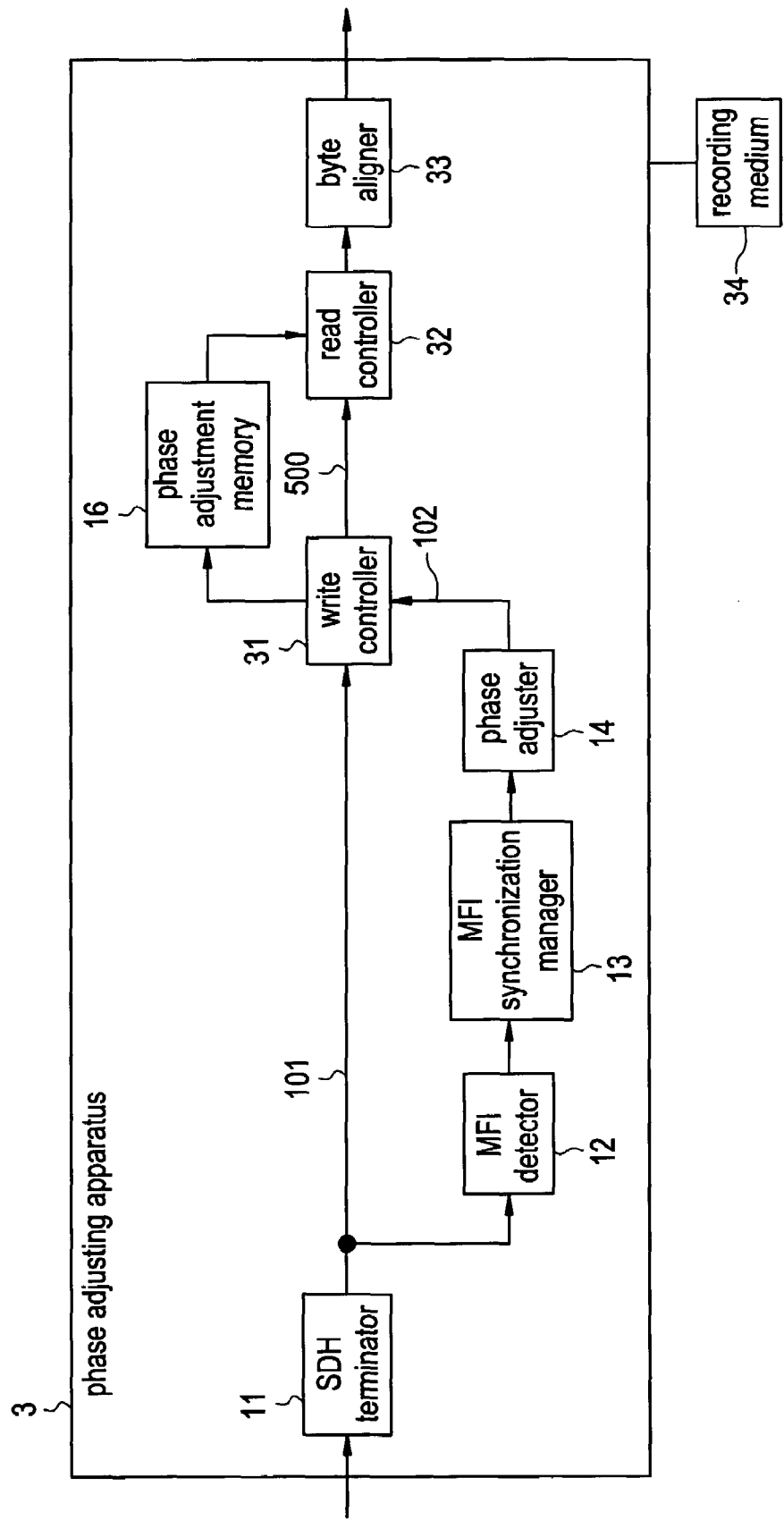
FIG. 11 is a block diagram of a phase adjusting apparatus according to another embodiment of the present invention.

FIG. 11 shows in block form a phase adjusting apparatus 3 according to another embodiment of the present invention. Phase adjusting apparatus 3 shown in FIG. 11 is similar to phase adjustment apparatus 1 shown in FIG. 4 except that write controller 15, read controller 18, and write frame manager 17 are replaced with write controller 31, read controller 32, and byte aligner 33. Those parts of phase adjusting apparatus 3 shown in FIG. 11 which are identical in arrangement and operation to those of phase adjustment apparatus 1 shown in FIG. 4 are denoted by identical reference characters, and will not be described in detail.

Figure 12:
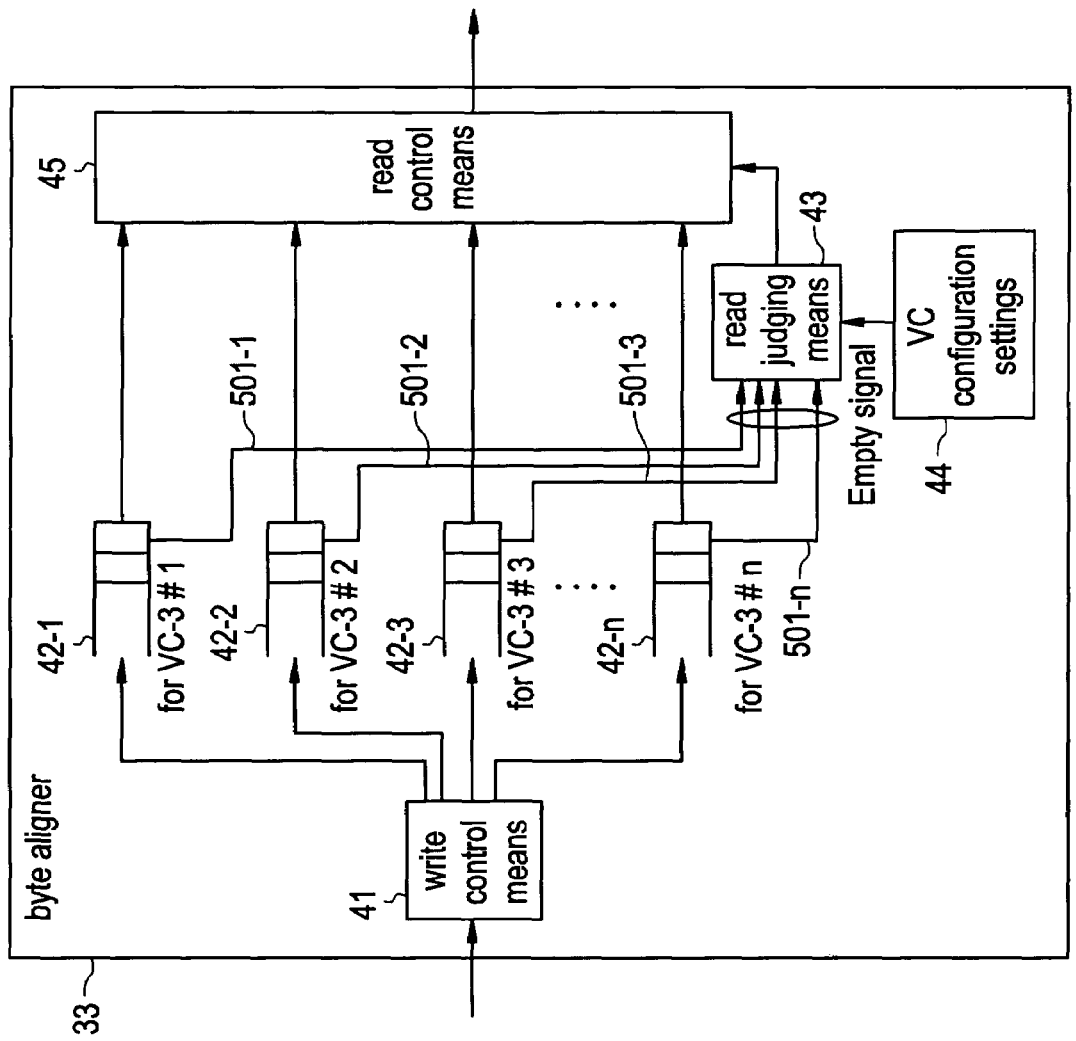
FIG. 12 is a block diagram of a byte aligner of the phase adjusting apparatus shown in FIG. 11.

FIG. 12 shows in block form byte aligner 33 shown in FIG. 11. As shown in FIG. 12, byte aligner 33 comprises write control means 41, FIFO (First-In, First-Out) memories 42-1 through 42-*n*, read judging means 43, VC configuration settings 44, and read control means 45.

Figure 13:
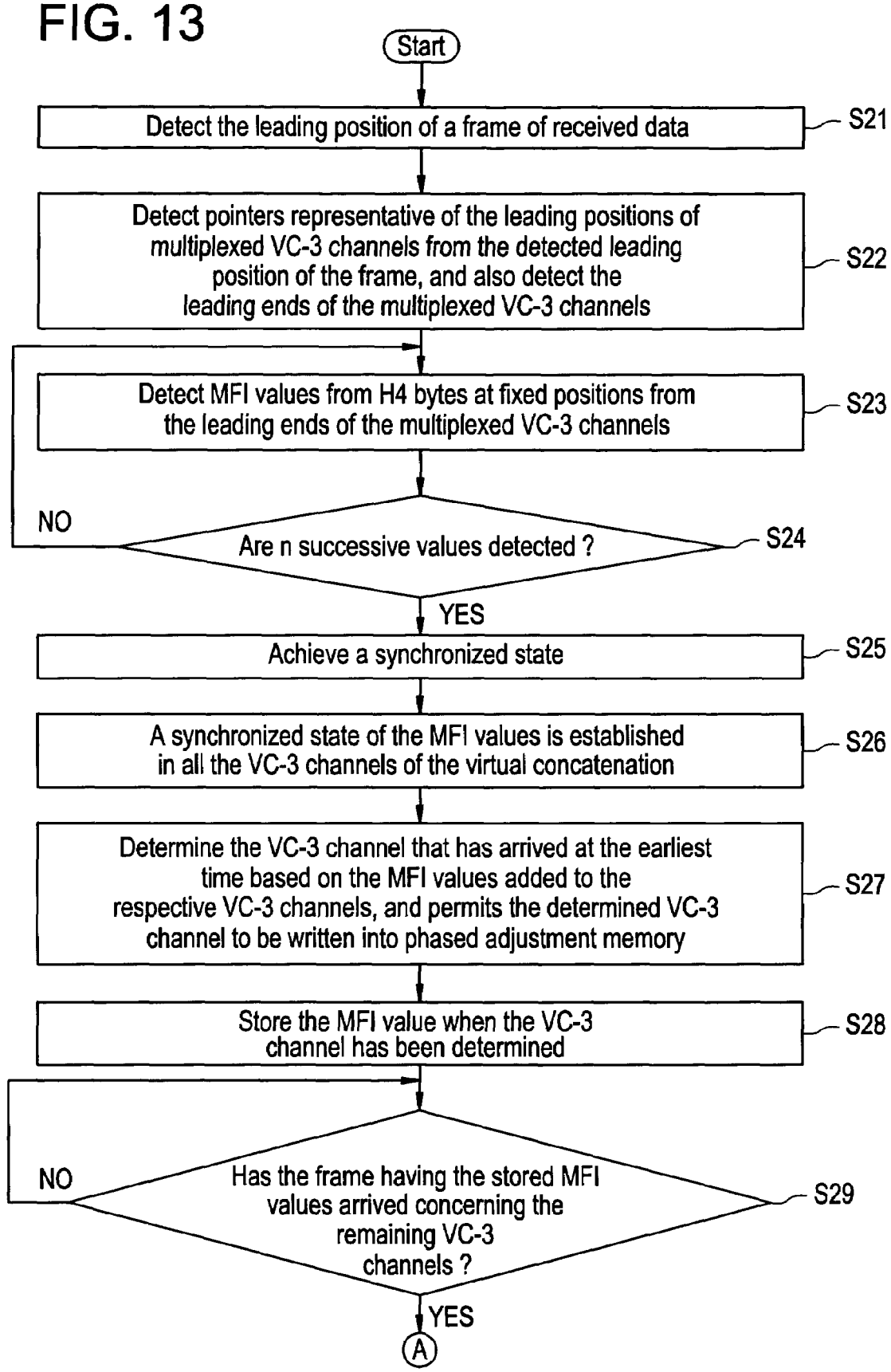
FIG. 13 is a flowchart of a portion of a processing sequence of the phase adjusting apparatus according to the other embodiment of the present invention.
Figure 14:
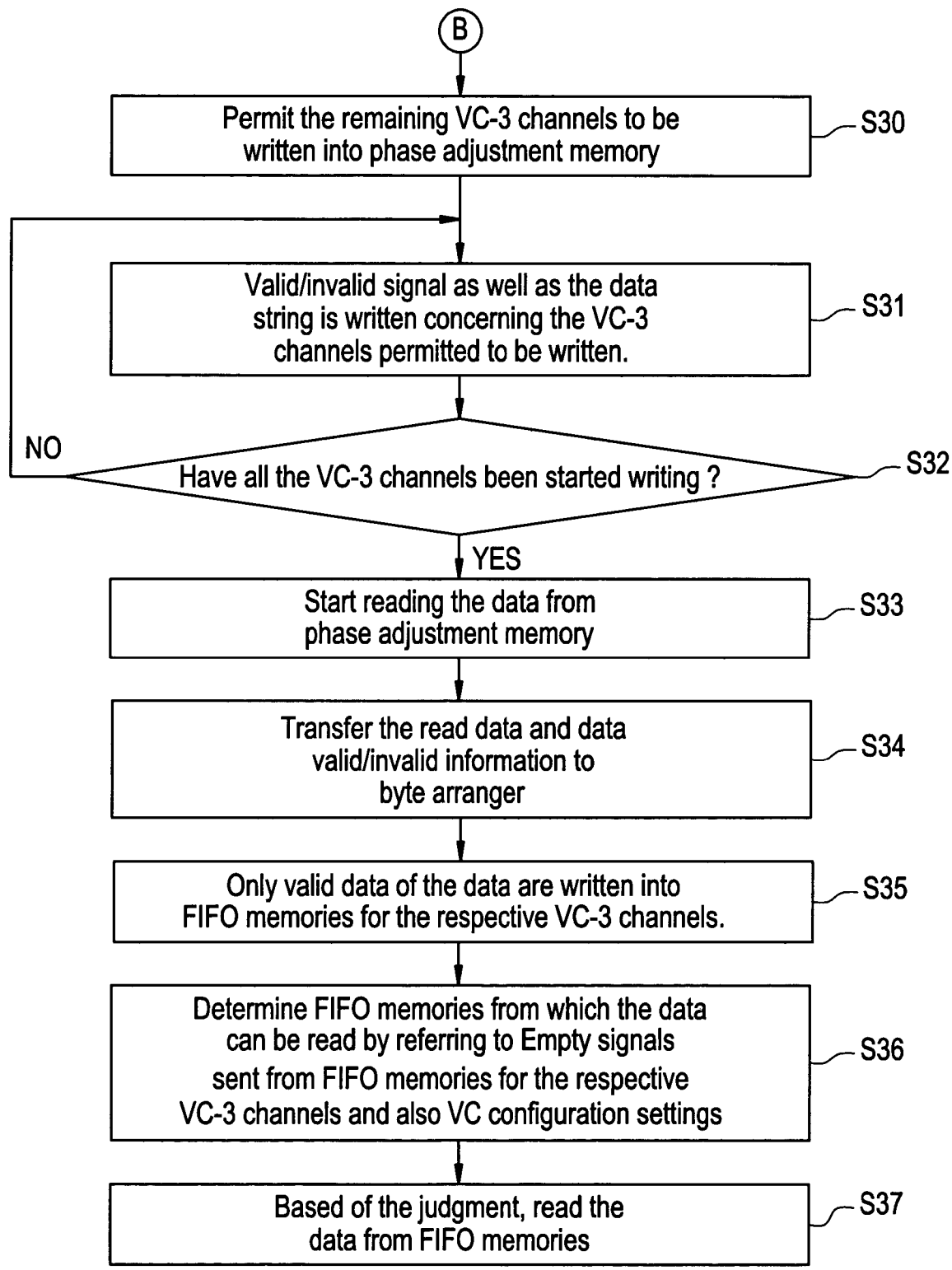
FIG. 14 is a flowchart of a remaining portion of the processing sequence of the phase adjusting apparatus according to the other embodiment of the present invention.

FIGS. 13 and 14 show a processing sequence of phase adjusting apparatus 3 according to the other embodiment of the present invention. Processing operation of phase adjusting apparatus 3 will be described below with reference to FIGS. 11 through 14. The processing sequence shown in FIGS. 9 and 10 is carried out when the program stored in recording medium 34 is run by the computer of phase adjusting apparatus 3. The process of terminating SDH data for phase adjustment (steps S21 through S29 shown in FIG. 13 and step S30 shown in FIG. 14) is identical to the corresponding process of phase adjustment apparatus 1, and will not be described in detail below.

Write controller 31 starts writing data into phase adjustment memory 16 based on write permission signal 102 from phase adjuster 14. In the previous embodiment, only payload 303 (other than the SOH/POH) shown in FIG. 7 is written into phase adjustment memory 16. In the present embodiment, however, all data (301-304) are written into phase adjustment memory 16. At this time, valid/invalid signal 300 as well as the data string is written into phase adjustment memory 16 in step S31 shown in FIG. 14.

Write controller 31 sends read permission signal 500 to read controller 32 when the data of all VC-3 channels that make up a concatenation start being written into phase adjustment memory 16. Based on read permission signal 500, read controller 32 starts reading the data from phase adjustment memory 16 in steps S32, S33, and transfers the read data and data valid/invalid information to byte aligner 33 in step S34.

In byte aligner 33, only valid data of the data sent from read controller 32 are written into FIFO memories 42-1 through 42-*n* for the respective VC-3 channels by write control means 41 in step S35.

The valid data refer to data 303 represented by valid/invalid signal 300. Valid/invalid signal 300 as well as the data is written in phase adjustment memory 16, and read therefrom to byte aligner 33 by read controller 32.

Read judging means 43 determines FIFO memories from which the data can be read by referring to Empty signals 501-1 through 501-*n* sent from FIFO memories 42-1 through 42-*n* for the respective VC-3 channels and also VC configuration settings 44 in step S36.

Specifically, read judging means 43 determines VC-3 channels making up each virtual concatenation by referring to VC configuration settings 44, and judges FIFO memories as being capable of reading data if the data have been stored therein (not Empty) with respect to all VC-3 channels making up a virtual concatenation.

Based on the judgment made by read judging means 43, read control means 45 reads the data from FIFO memories 42-1 through 42-*n* in step S37.

In the present embodiment, as described above, frame data and data valid/invalid information are written into phase adjustment memory 16, with only the function to align the leading ends of the VC-3 channels, and byte aligner 33 is provided in a stage subsequent to read controller 32 for adjusting the byte positions in the VC-3 channels. Therefore, the present embodiment offers new advantages in that the management process carried out by phase adjustment memory 16 is simplified to reduce delays caused thereby.

In the present embodiment, the process of reading VC-3 channels multiplexed in a STM-16 frame has been described above. However, the STM-16 frame may be replaced with an STM-64 frame, an STM-4 frame, etc., and the VC-3 channels may be replaced with VC-4 channels.

According to the present invention, as described above, a phase adjusting apparatus manages a chronological sequence of VC channels in a virtual concatenation which is made up of the VC channels in a signal of multiplexed VC channels, and adjust phases if the continuity of MFI values to which successive values are assigned for each frame is lost. The phase adjusting apparatus manages the MFI values of frames written into a phase adjustment memory in which the VC channels are written for adjusting phases, and reads each frame from the phase adjustment memory, which frame is judged as having been written in the phase adjustment memory when all the VC channels making up the virtual concatenation are written into the phase adjustment memory based on the MFI values. The phase adjusting apparatus is capable of adjusting phases without involving an increase in circuit scale and without depending on the generation of pointer stuff in SDH.

What is claimed is:

1. A phase adjusting apparatus comprising:
   a phase adjustment memory for writing therein VC (virtual container) channels for adjusting phases;
   managing means for managing MFI (Multi-Frame Indicator) values of frames written into said phase adjustment memory;
   judging means for determining whether all the VC channels making up a virtual concatenation have been written into said phase adjustment memory based on the MFI values managed by said managing means; and
   reading means for reading each frame from said phase adjustment memory, which frame is determined as having been written in said phase adjustment memory by said judging means.

2. A phase adjusting apparatus according to claim 1, wherein said phase adjustment memory writes therein other data than SOH/POH of said VC channels.

3. A phase adjusting apparatus according to claim 1, wherein said reading means comprises means for reading no data from said phase adjustment memory if all the VC channels making up the virtual concatenation have not been written into said phase adjustment memory, and reading no data from said phase adjustment memory until all frames having the same MFI values have been written in said phase adjustment memory.

4. A phase adjusting apparatus according to claim 2, wherein said reading means comprises means for reading no data from said phase adjustment memory if all the VC channels making up the virtual concatenation have not been written into said phase adjustment memory, and reading no data from said phase adjustment memory if all frames having the same MFI values have been written in said phase adjustment memory.

5. A phase adjusting apparatus comprising:
a phase adjustment memory for writing therein VC (virtual container) channels for adjusting phases;
holding means associated respectively with the VC channels, for holding only valid data of data read from said phase adjustment memory;
judging means for determining whether all the VC channels making up a virtual concatenation have been written into said holding means; and
reading means for reading a frame from said holding means, which frame is determined as having been written in said holding means by said judging means.

6. A phase adjusting apparatus according to claim 5, wherein said phase adjustment memory writes therein all data of said VC channels and information representing whether said data of the VC channels are valid or invalid.

7. A method of adjusting phases comprising:
managing MFI (Multi-Frame Indicator) values of frames written into a phase adjustment memory in which VC (virtual container) channels are written for adjusting phases;
determining whether all the VC channels making up a virtual concatenation have been written into said phase adjustment memory based on the managed MFI values; and
reading each frame from said phase adjustment memory, which frame is determined as having been written in said phase adjustment memory.

8. A method according to claim 7, wherein said phase adjustment memory writes therein other data than SOH/POH of said VC channels.

9. A method according to claim 7, further comprising the steps of:
reading no data from said phase adjustment memory if all the VC channels making up the virtual concatenation have not been written into said phase adjustment memory; and
reading no data from said phase adjustment memory until all frames having the same MFI values have been written in said phase adjustment memory.

10. A method according to claim 8, further comprising the steps of:
reading no data from said phase adjustment memory if all the VC channels making up the virtual concatenation have not been written into said phase adjustment memory; and
reading no data from said phase adjustment memory until all frames having the same MFI values have been written in said phase adjustment memory.

11. A method of adjusting phases comprising:
holding, in holding means associated respectively with VC (virtual container) channels, only valid data of data read from a phase adjustment memory in which the VC channels are written for adjusting phases;
determining whether all the VC channels making up a virtual concatenation have been written into said holding means; and
reading a frame from said holding means, which frame is determined as having been written in said holding means.

12. A method according to claim 11, wherein said phase adjustment memory writes therein all data of said VC channels and information representing whether said data of the VC channels are valid or invalid.

13. A computer readable medium storing a computer program for adjusting phases said computer program enabling a computer to carry out the steps of:
managing MFI (Multi-Frame Indicator) values of frames written into a phase adjustment memory in which VC (virtual container) channels are written for adjusting phases;
determining whether all the VC channels making up a virtual concatenation have been written into said phase adjustment memory based on the managed MFI values; and
reading each frame from said phase adjustment memory, which frame is determined as having been written in said phase adjustment memory.

14. A computer readable medium storing a program for performing a phase adjusting method, said computer program enabling a computer to carry out the steps of:
holding, in holding means associated respectively with VC (virtual container) channels, only valid data of data read from a phase adjustment memory in which the VC channels are written for adjusting phases;
determining whether all the VC channels making up a virtual concatenation have been written into said holding means; and
reading a frame from said holding means, which frame is determined as having been written in said holding means.

15. A phase adjusting apparatus comprising:
a phase adjustment memory for writing therein VC (virtual container) channels;
judging means for determining whether all the VC channels making up a virtual concatenation have been written into said phase adjustment memory; and
reading means for reading each frame from said phase adjustment memory, which frame is determined as having been written in said phase adjustment memory by said judging means.

16. The apparatus of claim 15, further comprising:
managing means for managing MFI (Multi-Frame Indicator) values of frames written into said phase adjustment memory, wherein
said determining is based on the MFI values managed by said managing means.

17. A method of adjusting phases, said method comprising:
writing VC (virtual container) channels into a phase adjusting memory;
determining whether all the VC channels making up a virtual concatenation have been written into said phase adjustment memory; and
reading each frame from said phase adjustment memory, which frame is determined as having been written in said phase adjustment memory.

18. The method of claim 17, wherein said determining is based on MFI (Multi-Frame Indicator) values written into the phase adjustment memory in which the VC channels are written.

* * * * *